Patented Aug. 30, 1949

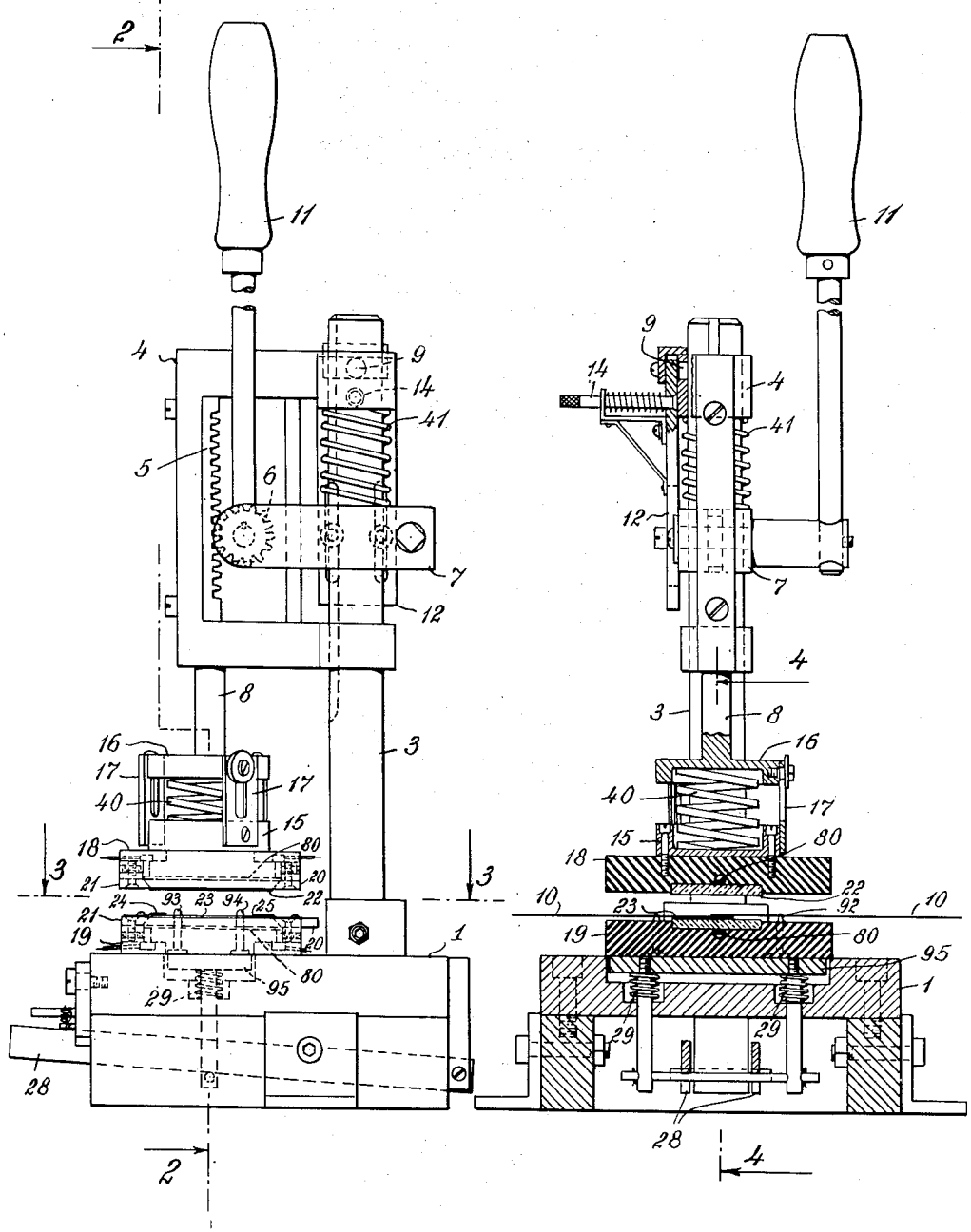

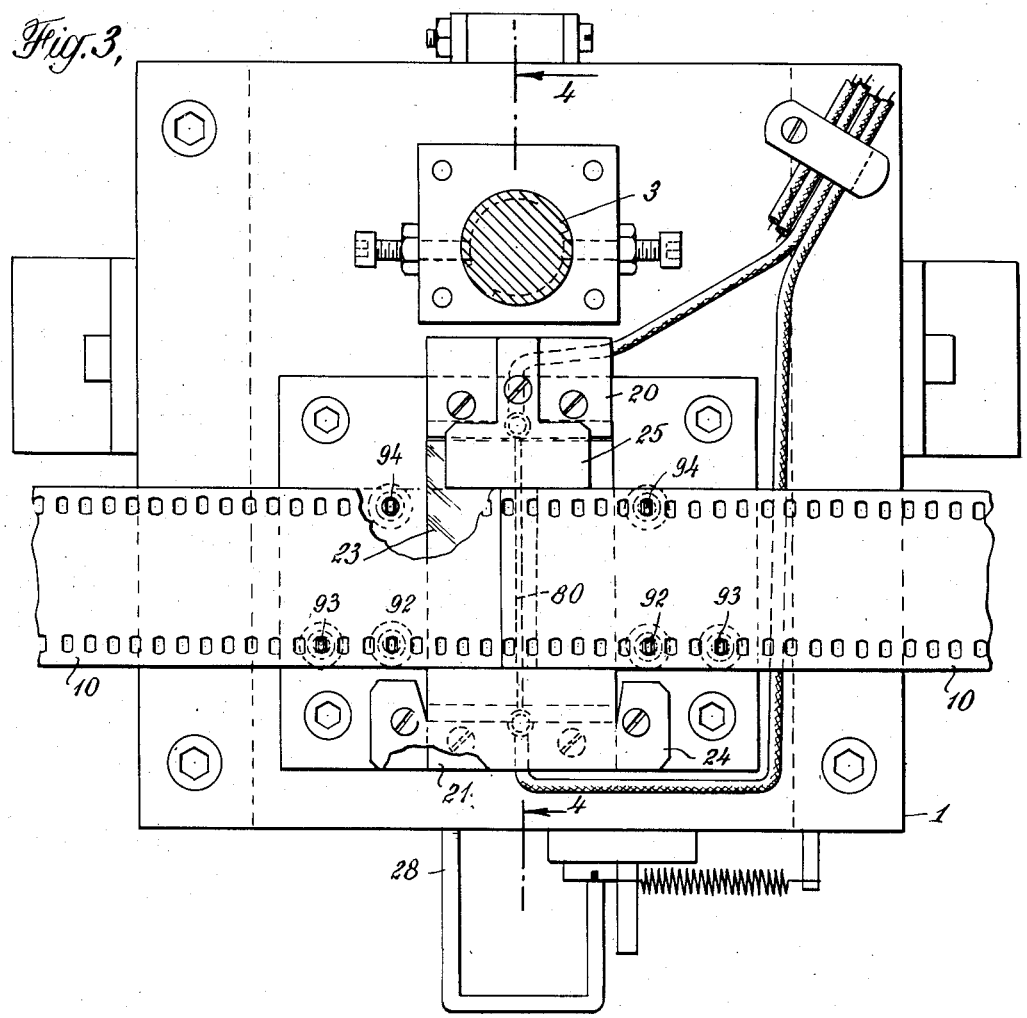
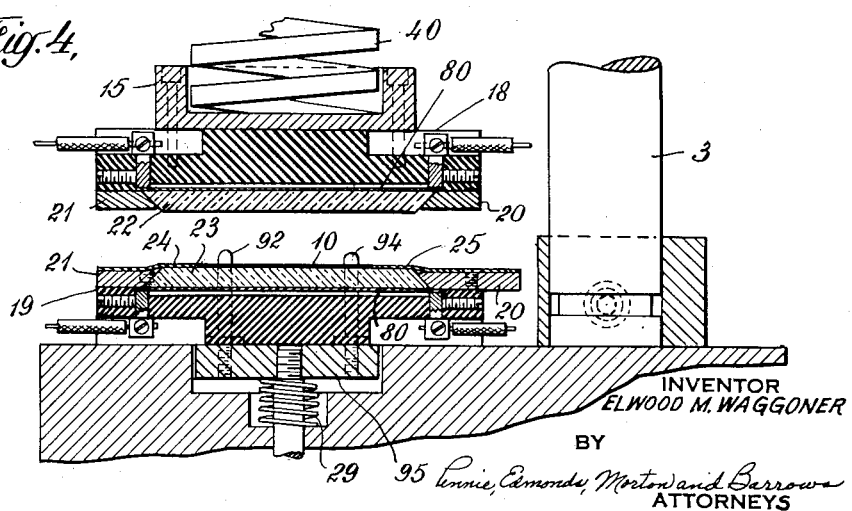

2,480,794

UNITED STATES PATENT OFFICE 2,480,794

FILM SPLICING APPARATUS

Elwood M. Waggoner, Poughkeepsie, N. Y., assignor to Frederick Hart & Co., Inc., Poughkeepsie, N. Y., a corporation of Delaware Application June 17, 1947, Serial No. 755,131

8 Claims. (Cl. 154—42.1)

This invention relates to apparatus for producing splices in motion picture films without spreading or thickening of the films at the splice. It is especially applicable to the splicing of films of the acetate, Vinylite, and other so-called noninflammable types.

The invention provides means whereby the ends of the films to be spliced may be accurately supported and confined and whereby closely controlled temperatures and pressures may be applied to the film ends so that splices are achieved which require no trimming and which are of such thickness and flexibility as to be substantially indistinguishable from the rest of the film.

In the case of loop films in sound-on-film recorders for example, it is desirable that the spliced films be able to pass smoothly through the recording and reproducing heads. The apparatus of my invention produces splices which are of substantially the same thickness as the rest of the film so that the recording and reproducing heads are preserved from mechanical shock in passing over the splices. If the films to be spliced bear previously embossed sound tracks it is important that the lateral registry between the spliced portions be such that the reproducing stylus in passing across the splice will not jump to an adjacent parallel sound track.

While some of the advantages of my invention have been pointed out with reference to films for use in sound-on-film recorders, the transparency, uniformity and flexibility of the splices which may be made with the apparatus of my invention are desirable in other uses of motion picture films as well.

My invention will be better understood from an examination of the following description taken in conjunction with the accompanying figures in which:

Fig. 1 is a side elevation of a device adapted to the practice of the present invention;

Fig. 2 is a front view of the apparatus shown in Fig. 1, shown partly in section as taken along the line 2—2 of Fig. 1;

Fig. 3 is a sectional view taken along the line 3—3 of Fig. 1 but at double the scale of Fig. 1, showing particularly the means for holding the film ends in position during splicing; and Fig. 4 is a fragmentary sectional view taken along the line 4—4 of Fig. 2, also at double the scale of Fig. 2.

Referring to Figs 1 and 2, a suitable frame 1 supports from below a lower plate holder 19 against which an upper plate holder 18 may be resiliently pressed by force exerted from above. The holders 18 and 19 are preferably made of a nonmetallic material such as Bakelite having low heat capacity and conductivity. A shaft 3 is mounted in the frame 1 against motion lengthwise of its own axis relative to the frame. The shaft 3 supports the upper plate holder 18 and means for stressing the same against the lower plate holder 19 with a stress ranging up to some 250 lbs. The shaft 3 carries a bracket 4 movable lengthwise thereof but prevented from rotation with respect thereto by its engagement with a keyway on the shaft. Extending from the underside of the bracket 4 approximately over the center of the holder 19 is a pressure shaft 8. The shaft 8 carries on its lower end a cup 16 open downwards into which fits a compression coil spring 40 capable of withstanding a higher stress than the maximum employed in splicing without complete collapse of its coils. A lower spring cup 15 receives the stress of the coil spring 40 and transmits it to the upper pressure plate 18. The upper and lower cups are held together by means of guide plates 17. The flexible connection provided by the spring 40 and the guide plates 17 between the shaft 8 and the upper plate holder 18 permits alignment between the upper and lower plate holders when they are pressed together, regardless of the orientation and flexing of the shaft 8 and bracket 4 with respect to the frame 1. The holders 18 and 19 are squeezed together with the film ends to be spliced therebetween by means of stress transmitted from the shaft 3 to the bracket 4 through the mechanism of a rack 5 on the bracket 4 and a pinion 6 affixed to the shaft 3 by means of a pinion bracket 7. The pinion 6 is journaled in the pinion bracket 7 and may be rotated by means of a lever and handle 11 fixed to the shaft of the pinion. When the handle 11 is released, the bracket 4 is raised so as to separate the pressure plates by means of a coil spring 41 engaged about the shaft 3 between the pinion bracket 7 and the bracket 4.

The splicing is accomplished by heating and pressing the ends of the film, very slightly overlapped as indicated in Figs. 2 and 3, between two smooth plates 22 and 23 of a material having a low heat conductivity mounted in the upper and lower plate holders 18 and 19, respectively. The plates 22 and 23 lie in shallow mortises cut in the holders, so that the plates project above the surface of the holders. The plates 22 and 23, which may be of glass or mica or similar material, should be perfectly plane and should have a high degree of polish so as to minimize damage to the sound tracks embossed in the film which is squeezed therebetween in the process of splicing. Corning "Vycor" glass number 790 is suitable for the purpose. The glass plates are retained in the holders 18 and 19 by plate retainers 20 and 21 (shown in Figs. 1 and 4) having a thickness slightly less than that of the plates, so that the stress between the plate holders 18 and 19 is restricted to the area of the glass plates. Spreading of the film laterally during the splicing process is prevented by a pair of thin sheet metal film retainers 24 and 25, which are fastened to the lower plate holder 19 so as to overlie the lower glass plate 23 and to form a channel of width equal to that of the film to be spliced. The retainers are made of material thinner than the film to be spliced, so as not to affect the pressure applied to the film during the splicing process. For example, in splicing cellulose acetate film 0.0075 in. thick, film retainers 0.005 in. thick may be used.

Heat is applied to the restricted area of the overlap of the ends of the films to be spliced by means of resistance wires 80 lying in contact with the glass plates on the sides thereof away from the films. The relation of the resistance wires to the glass plates and to the films is indicated in Fig. 2 and Fig. 3, in which the overlapped ends 10 of two films to be spliced have been indicated. The low heat conductivity of glass makes possible the production of temperatures sufficient to the splicing process in the minute area of the film overlap without destruction of the embossed sound tracks away from that area. The resistance wires 80, which may be made for example of "Chromel" C in the form of a ribbon .003 in. thick and .040 in. wide, are connected through suitable leads to the frame 1 and thence in parallel to a variable low voltage source (not shown), by means of which their temperatures may be controlled over wide limits.

The film ends to be joined by splicing are held in exact lateral registry for splicing on the lower plate holder 19 by means of two sets of sprocket hole engaging pins which extend up through the lower plate holder on either side of the glass plate 23. Both sets of pins are rigidly mounted together on a spider 95 below the lower plate holder, so that one set of pins, positioning one film end, may not move relative to the other. The spider 95 may be lowered by means of a lever 28 so as to retract the pins flush with the lower plate holder and allow easy removal of the spliced film. Springs 29 raise the spider and keep the pins extended above the lower plate holder when the lever 28 is released. Each set of pins comprises three pins 92, 93, and 94 arrayed in a triangle so as to engage the film end against both longitudinal and lateral movement, and the spacing of the pins includes whatever play is normally given so as to prevent all motion of the film ends when once engaged on the pins. Complementary holes are provided in the upper plate holder to receive the pins when the plate holders are pressed together. By accurately spacing the pins crosswise of the film, the registry of the films at the splice can be so controlled that all sound tracks on one side of the splice will be continuous with the same sound tracks on the other side of the splice, in the case of a splice of films already bearing sound tracks embossed therein.

The pressure required to successfully splice the film ends is critical in relation to the temperature to which the film ends to be spliced are raised. Unless the pressures and temperatures employed are properly related the film at the splice will be thicker or thinner than elsewhere and of different flexibility. The pressure is governed by the elastic characteristics of the spring 40 and the amount of compression thereof produced by motion of the bracket 4 relative to the shaft 3, after the upper glass plate has come into contact with the overlapped film ends. To provide accurate, uniform, and reproducible results an automatic pressure control mechanism is provided which limits the motion of the bracket 4 to the required amount. This pressure control mechanism is shown in Fig. 2. It consists of a spring-loaded pin 14 mounted on a plate 12 which is affixed to the pinion bracket 7. A bore 9 is provided in the side face of the bracket 4 into which the pin 14 drops when the bracket 4 has been depressed along the shaft 3 the distance necessary to effect proper compression of spring 40. The plate 12 is adjustable in position along the pinion bracket 7 to compensate for variations in the dimensions and elastic properties of the spring 40.

In making a splice the ends of the films to be joined are trimmed square so as to have an overlap of about 1/64 of an inch when the two ends are engaged on the sprocket hole engaging pins. The ends of the films to be spliced are cleaned on the faces which are to adhere by means of a cleaner which will remove oil and foreign matter. For a cellulose acetate film, for example, alcohol is suitable. The resistance wires 80 are energized so as to bring the glass plates 22 and 23 to a temperature of approximately 140° F. in the immediate area to be occupied by the film overlap. If the ends of the film are carefully cleaned they may be spliced together without the use of a solvent or adhesive by the application of properly related temperatures and pressures. The ends of the films to be spliced are engaged on the pins and the overlapping ends are squeezed together between the heated glass plates with a stress sufficient to provide an initial pressure on the area of overlap of about 10,000 lbs. per sq. in. The minimum and maximum satisfactory pressures for splicing without a solvent are 9,700 and 11,080 lbs. per sq. in. respectively. For 35 mm. film and an overlap of 1/64 in. a pressure of 10,000 lbs. per sq. in. is provided by a total stress of 225 lbs. Heating of the resistance wires 80 is continued at a rate sufficient to bring the temperature of the film at the overlap to 350° F. at the end of one minute after the first application of pressure. Under these conditions of temperature and pressure the overlapped film ends flow together and the thickness of the overlap is reduced from double the film thickness of 0.0075 in. to not more than 0.0078 in. Spreading of the film material laterally is prevented by the film retainers 24 and 25. Since these retainers are thinner than the film, they bear no part of the splicing pressure.

The current to the heating wires 80 is then turned off and the splice is left to cool for about one minute so that the temperature of the splice may fall below the distortion point for the film. The bracket 4 is then lifted and the film may be removed from the splicing fixture by depressing the lever 28 to disengage the sprocket hole engaging pins. Upon removal of the film a splice is detectable by looking through the film, but it cannot be felt with the fingers. The thickness of the resulting film at the splice does not vary from that of the rest of the film by more than 0.0003 in. and the width of the film is unchanged so that the film is mechanically perfect at the splice for passing through an exposing frame or recording or reproducing head.

The structure hereinabove described in detail is of course intended only as an illustration of a particular embodiment of my invention. The form and disposition of the various parts of the structure may be varied without departing from the scope of the claims.

I claim:

1. A film splicing apparatus comprising a base, a first support mounted on said base, a first glass film splicing plate mounted on said support, a first substantially straight electrical resistance heating element disposed beneath said glass plate, a film retaining member arranged at each side of said glass plate, the space between said retaining members being substantially equal to the width of the film to be spiced, a lever pivoted in said base, a supporting member mounted on said lever, a plurality of film sprocket hole engaging pins affixed to said supporting member and adapted to protrude retractably above the surface of said glass plate on either side thereof, an upright member arranged on said base, a bracket movably mounted on said upright member, a calibrated compression spring arranged beneath said bracket, a second support affixed to said spring, a second glass film splicing plate affixed to said second support, a second electrical resistance heating element arranged on said second glass film splicing plate in parallel relation with said first heating element, a rack affixed to said bracket, a pinion supporting bracket adjustably fixable on said upright member, a pinion journaled in said pinion supporting bracket and engaging said rack, means to rotate said pinion, and adjustable indexing means to limit the motion of said bracket upon the attainment of a prechosen compression of said spring.

2. In a film splicing apparatus a base, a plate holder supported on said base, a first plate mounted in said plate holder with its surface substantially flush with that of said plate holder, a film retaining member of a thickness not greater than that of the film to be spliced disposed at each side of said plate and extending partially over the same, the space between said film retaining members being substantially equal to the width of the film to be spliced, a first heating element arranged transversely of said plate beneath the same, an upright member arranged on said base, a bracket movable lengthwise of said upright member, a calibrated compression coil spring arranged on the under side of said bracket, a second plate holder arranged on said coil spring to receive the stress imparted thereto by said bracket, a second plate mounted in said second plate holder, a second heating element arranged on said second plate in geometrically parallel relation with said first heating element, motor means for imparting motion to said bracket lengthwise of said upright member, and a plurality of film holding and engaging pins retractably protruding above the surface of said first plate on either side thereof adapted to hold the ends of the films to be spliced in parallel relation with exact lateral registry.

3. A film splicing apparatus comprising a base, a smooth surfaced film support mounted on said base, a plurality of integrally formed film sprocket hole engaging pins movably mounted on said base and retractably protruding above the surface of said film support on either side thereof in position to engage the ends of the films to be spliced with exact lateral registry thereof, an upright member mounted on said base, a stressing member movable with respect to said upright member, motor means for imparting motion to said stressing member relative to said upright member, a smooth surfaced film pressing member movably mounted on said stressing member for abutment against said film support, resilient spring means interposed between said stressing member and said film pressing member for communicating stress from said stressing member to said film pressing member, indexing means for limiting the motion of said stressing member relative to said upright member, and electrical resistance heating elements disposed on the remote faces of said film support and said film pressing member and adapted to heat the adjacent faces of said support and said member over a limited area.

4. A film splicing apparatus comprising a base, a film supporting member mounted on said base, an upright member mounted on said base, a stressing member movable relative to said upright member, motor means for moving said stressing member relative to said upright member, an elastic member mounted on said stressing member, a film pressing member movably mounted on said elastic member and receiving the stress exerted by said elastic member when the latter is strained by motion of said stressing member, an indexing bore in said stressing member, and a spring loaded indexing pin adjustably fixable in said upright member along the path of said bore generated by motion of said stressing member.

5. A film splicing apparatus comprising a base, a first smooth surfaced pressure plate mounted on said base, an upright member, a bracket movably mounted on said upright member, motor means for imparting motion to said bracket lengthwise of said upright member, a calibrated elastic member mounted on said bracket mediately of said bracket and said first pressure plate, a second smooth surfaced pressure plate mounted on said elastic member mediately of said first pressure plate and said elastic member, and electrical resistance heating elements disposed in substantially parallel relation on the remote sides of said pressure plates.

6. A film splicing apparatus comprising a base, a first smooth surfaced member mounted on said base, an upright member fixed in said base against motion lengthwise of itself relative to said base, a bracket movably mounted on said upright member, motor means for imparting motion to said bracket lengthwise of said upright member, a second smooth surfaced member mounted on said bracket for limited motion with respect thereto and adapted to abut against said first smooth surfaced member, resilient spring means interposed between said bracket and said second smooth surfaced member, and electrical resistance heating means mounted on said smooth surfaced members and adapted to heat the same along narrow opposite contacting areas thereof.

7. In a film splicing apparatus including a pair of pressure plates adapted to be stressed together between a base and an elastic member deformed by motion of a stressing member relative to an upright member affixed to said base, an automatic pressure limiting device comprising a spring loaded pin fixed relative to said upright member against motion transverse to its own axis and bearing against said bracket, and a bore in said bracket aligned with said pin with respect to the motion of said stressing member relative to said upright member.

8. In a film splicing apparatus including a pair of pressure plates adapted to be stressed together between a base and an elastic member deformed by motion of a bracket relative to an upright member affixed to said base, an automatic pressure limiting device comprising a recess in said bracket, and a spring loaded pin adjustably fixable with respect to said upright member against motion transverse to its own axis along the line of positions defined by said recess in the course of motion of said bracket.

ELWOOD M. WAGGONER.

REFERENCES CITED

The following references are of record in the file of this patent:

UNITED STATES PATENTS

| Number | Name | Date |
|---|---|---|
| 1,088,478 | Stow | Feb. 24, 1914 |
| 1,146,003 | Lang | July 13, 1915 |
| 1,195,175 | Bendheim | Aug. 22, 1916 |
| 1,334,903 | Howell | Mar. 23, 1920 |
| 2,289,618 | Young | July 14, 1942 |
| 2,301,664 | Eggert et al. | Nov. 10, 1942 |